(12) United States Patent
Livshiz et al.

(10) Patent No.: US 6,229,125 B1
(45) Date of Patent: May 8, 2001

(54) ELECTROMAGNETIC FORMING APPARATUS

(75) Inventors: Yuri Livshiz, Ariel; Oren Gafri, Rishon le-Zion, both of (IL)

(73) Assignee: Pulsar Welding Ltd., Yavane (IL)

( * ) Notice: Subject to any disclaimer, the term of this patent is extended or adjusted under 35 U.S.C. 154(b) by 0 days.

(21) Appl. No.: 09/308,717

(22) PCT Filed: Nov. 24, 1997

(86) PCT No.: PCT/IL97/00384

§ 371 Date: Jul. 16, 1999

§ 102(e) Date: Jul. 16, 1999

(87) PCT Pub. No.: WO98/23400

PCT Pub. Date: Jun. 4, 1998

(30) Foreign Application Priority Data

Nov. 24, 1996 (IL) .......................................... 119679

(51) Int. Cl.[7] ....................................... B23K 13/01
(52) U.S. Cl. ................................. 219/617; 72/56
(58) Field of Search ....................... 72/56; 219/600–609; 335/284

(56) References Cited

U.S. PATENT DOCUMENTS

| | | | |
|---|---|---|---|
| 3,654,787 | * 4/1972 | Brower | 72/56 |
| 3,832,509 | 8/1974 | Mikhailov et al. . | |
| 4,143,532 | 3/1979 | Khimenko et al. . | |
| 4,169,364 | * 10/1979 | Khimenko et al. | 72/56 |
| 4,170,887 | 10/1979 | Baranov . | |
| 4,731,393 | 3/1988 | Karrer et al. . | |
| 5,442,846 | 8/1995 | Snaper . | |
| 5,586,460 | 12/1996 | Steingroever . | |
| 5,824,998 | * 10/1998 | Livshiz et al. | 219/617 |
| 5,981,921 | * 11/1999 | Yablochnikov | 219/603 |

FOREIGN PATENT DOCUMENTS

| | | |
|---|---|---|
| 4436615 | 4/1996 | (DE) . |
| 1075285 | 7/1967 | (GB) . |
| 2147839 | 3/1985 | (GB) . |

* cited by examiner

*Primary Examiner*—Lincoln Donovan
(74) *Attorney, Agent, or Firm*—Browdy And Neimark

(57) ABSTRACT

A novel apparatus for pulse magnetic forming of a tubular workpiece is provided. The apparatus forms functionally a single wind coil and is particularly suitable for joining or welding of a tube onto another tube or a cylindrical object.

10 Claims, 12 Drawing Sheets

ELECTROMAGNETIC FORMING APPARATUS

CROSS REFERENCE TO RELATED APPLICATION

The present application is the national stage under 35 U.S.C. 371 of PCT/IL9700384, filed Nov. 24, 1997.

FIELD OF THE INVENTION

The present invention is generally in the field of forming of metal objects by means of pulse magnetic force (PMF) forming. PMF forming are processes where a short duration magnetic pulse is used to change the form of a metal workpiece. Change in form may be an object by itself whereby the workpiece assumes a different form. At times, however, the change in form results in the forced and rapid pressing of one workpiece against another which eventually results in either joining two workpieces together or welding both pieces, one to another. (Joining is a process whereby the surfaces of two workpieces come into close association with one another, without a molecular interaction between the two surfaces, while welding is the process where the surfaces of the two workpieces in fact merge with one another, there being an interaction on the molecular level between the two surfaces). The term "forming" or "PMF forming" as used herein, will denote all such processes.

BACKGROUND OF THE INVENTION

PMF forming processes, particularly of cylindrical objects have hitherto been disclosed. See for example U.S. Pat. Nos. 3,654,787, 3,832,509, 4,143,532, 4,170,887, 4,531,393 and 4,442,846 and DE-4,436,615. In such PMF processes, a forming coil, particularly a single wind coil, is placed around the tubular workpiece to be formed. The passing of a short duration high intensity electric current through the coil, gives rise to eddy currents in the metal workpiece, this in turn creating a magnetic pressure, resulting from the repulsive forces between the forming coil and the metal workpiece. This magnetic pressure then brings to shrinkage of the tubular workpiece. The end result, whether there will be only forming, or whether the tubular workpiece will join or weld to another workpiece, depends on the exact circumstances of the process. For effective PMF forming high intensity magnetic fields are required and in order to achieve that, it is at times useful to use a field shaper, which is in fact a secondary coil, surrounded by several windings of a primary coil connected to an electrical energy source, typically a discharge capacitor.

An effective PMF forming process, requires that there be a close proximity between the forming coil (whether a primary coil connected to an energy source or a secondary coil—the field shaper) and the metal workpiece. This however may create technical difficulties in a number of cases. For example, in the case of joining of long steel pipes by a bridging sleeve, such as that described in U.S. Pat. No. 5,442,846, it is necessary to be able to open the coil to allow the sideways withdrawal of the pipes with the joining sleeve after joining (otherwise, it would have been necessary to extract the pipe by pulling it lengthwise, which is very often practically impossible).

Another example is the joining of cable lugs to an electric cable. Cable lugs are objects which have a tubular portion, adapted to receive an end of an electric cable and another portion, generally planar, having a hole which allows passage therethrough of a screw for tight attachment to another cable lug, to an electric power source or to a ground lead. In order to ensure tight contact between an electric cable and the cable lug, after insertion of an end of a cable into the tubular portion, the walls of this tubular portion are shrunk and tightly pressed onto the end portion of the cable contained therein. This has hitherto been achieved primarily by mechanical means.

The tight joining of a tubular portion of a cable lug and a cable end can also be achieved by means of PMF forming. However, the problem is that the planar portion of the lug is of a wider dimension than the diameter of the tubular portion and accordingly, if the forming coil would have been a standard fixed coil, it would have been practically impossible to extract the cable after forming. Apparatuses specifically designed for joining of a tubular workpiece to another tubular or cylindrical workpiece, are disclosed in U.S. Pat. Nos. 3,654,787, 4,531,393 and 5,442,846. However, the apparatuses disclosed in these U.S. patents are bulky and are not suitable for field use which is where the joining of the cable end and the cable lug takes place.

The forming apparatuses disclosed in these three patents, have all a common feature in that the two halves which are clamped together so as to define a PMF forming region around the workpiece to be formed, are each connected to a different pole of the electric discharge source. The problem is that the electric contact with the source has to be a very low resistance contact, and accordingly a bulky arrangement is required to ensure the maintenance of such a contact notwithstanding the fact that at least one of the two halves of the forming coil has to be displacable.

GENERAL DESCRIPTION OF THE INVENTION

It is an object of the invention to provide a new apparatus for PMF forming. It is particularly an object to provide such an apparatus for use in joining of cable lugs to an end of an electrical cable, adapted for field use.

There are several aspects of the invention. In accordance with some aspects, the apparatus comprises a forming coil in direct contact with the electric discharge circuitry. In other aspects, the forming coil is in fact a secondary coil where current is induced by a primary coil which is in turn in direct electrical contact with an electrical discharge circuitry. The common feature in the apparatuses in accordance with all aspects of the invention is the fact that there is on the one hand, permanent electrical contact between the forming coil or the primary coil, as the case may be, and on the other hand, means are provided for easy placement of the tubular object to be formed in a forming space of the forming coil and extraction of the workpiece after forming.

In accordance with a first aspect of the invention there is provided an apparatus for pulse magnetic forming of a tubular workpiece having a coil assembly comprising:

a single wind first coil member having two ends each of which being in electrical contact with one pole of an electrical discharge mechanism; a second coil member being a complete closed loop and having a shape and size such that it traces a path parallel to that traced by said first coil; the members being detachably attached to one another such that they are positioned parallel and adjacent one another, there being an electrically insulating layer between them; said coil member having a first recess or band and said ring member having a second recess or band, the two recesses or bands being juxtaposed to one another and defining together a forming space adapted to receive said workpiece.

In accordance with a second aspect of the invention there is provided an apparatus for pulse magnetic forming of a tubular workpiece comprising:

at least one primary coil electrically connected to an electrical discharge mechanism; two removable inserts defining together a loop with an outer surface within and adjacent said at least one primary coil and an inner surface defining a cylindrical forming space adapted to receive said workpiece, each insert having two end portions adjacent the end portions of the other insert, the arrangement being such that there is no electrical contact between the end portions of the two inserts; each of said inserts defining a current flow path comprising the outer and inner surfaces of the inserts and upon discharge of current in the primary coil which gives rise to current flow in the primary coil in a first circular direction, current in the outer surface of the insert flows in a second direction opposite the first and current in the inner surface flows in said first direction, whereby the current flowing in the two inner surfaces of the two inserts form together a loop of current around the forming space.

In accordance with a third aspect of the invention, there is provided an apparatus for pulse magnetic forming of a tubular workpiece comprising:

a single wind coil consisting of three coil sections having inner faces defining together a forming space adapted to receive said workpiece, the three coil sections consisting of a first section in an electrical contact with a first pole of an electric discharge circuit, a second section in an electrical contact with a second pole of the electric discharge circuit, and a third, intermediate section, detachably engaged with said first and said second sections in a manner so that said intermediate sections is in a low-resistance electrical contact with both said first and said second sections.

The invention will now be illustrated in the following description of some non-limiting specific embodiments with occasional reference to the annexed drawings:

BRIEF DESCRIPTION OF THE DRAWINGS

FIG. 1 is a schematic representation of apparatuses of the invention wherein;

FIG. 8 is a front elevational view of a coil with inserts according to the second aspect of the invention, wherein:

FIG. 11 shows a specific embodiment of a forming coil in accordance with the second aspect of the invention for field use in PMF joining of a cable lug to a cable, wherein:

DESCRIPTION OF SPECIFIC EMBODIMENTS

Figure 1A:
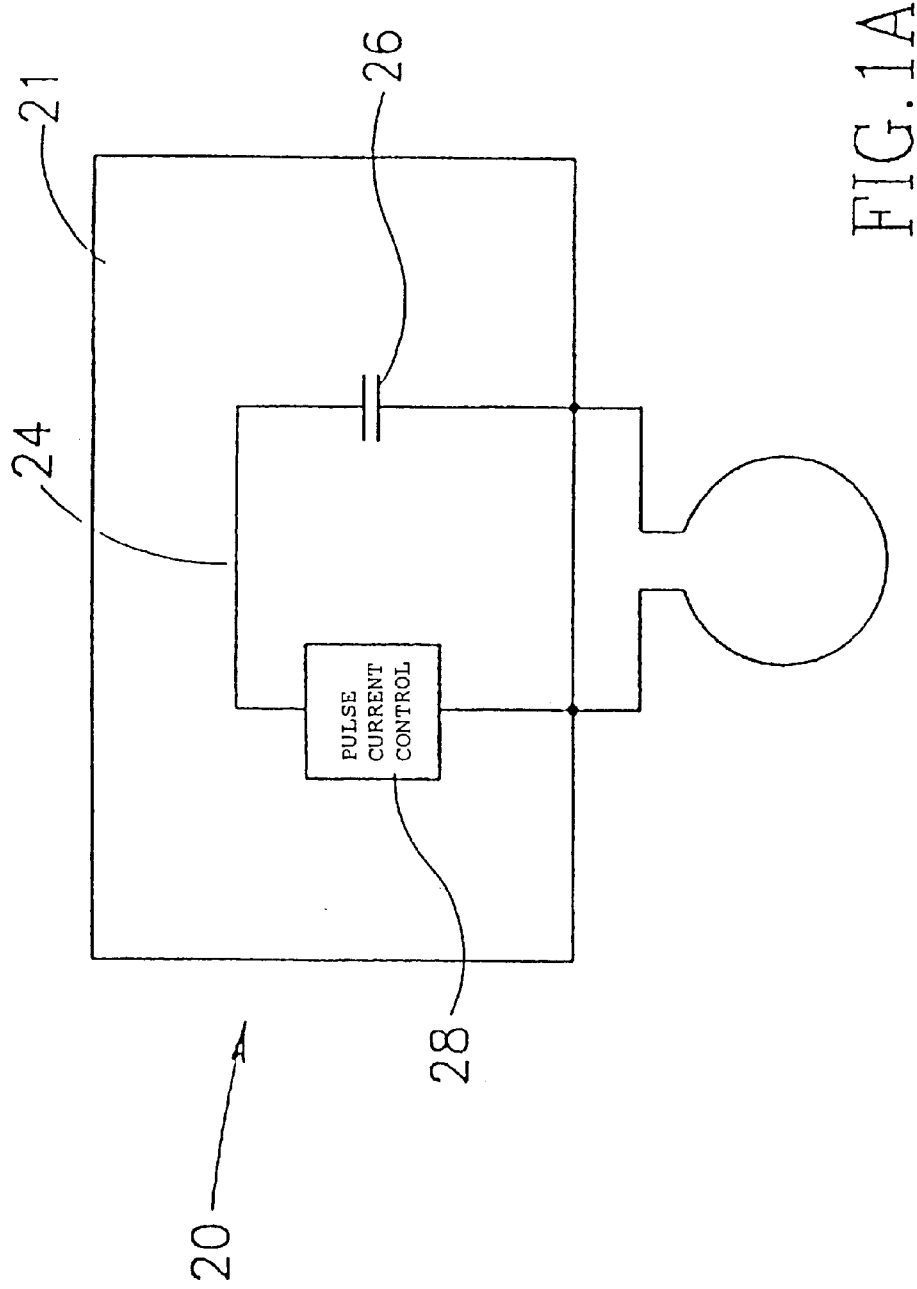
FIG. 1A shows an apparatus where the primary coil is in direct contact with the electric discharge circuitry.

Reference is first being made to FIG. 1, showing schematic representations of two apparatuses of the invention. The apparatus generally designated 20 shown in FIG. I comprises an electric discharge unit 21 and a forming coil 22. Electric discharge unit 21 holds an electric discharge circuitry 24 comprising a discharge capacitor or bank of capacitors 26 and a pulse control module 28. In the embodiment of FIG. 1A, the forming coil 22 is in direct electric contact with the discharge circuitry 24.

Figure 1B:
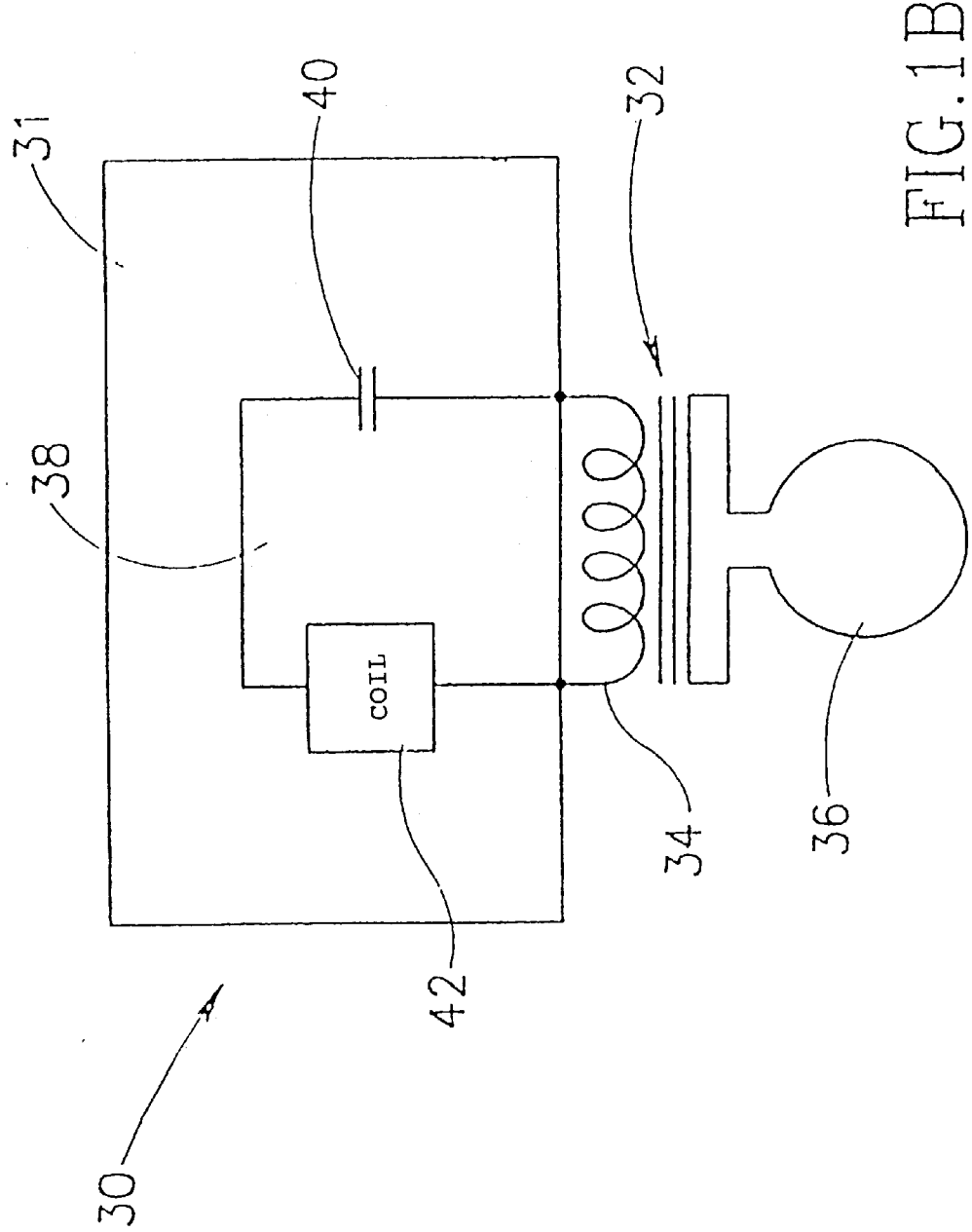
FIG. 1B shows an apparatus where the electric discharge circuitry is in direct contact with a primary coil which is in inductance relationship with the forming coil.

The apparatus shown in FIG. 1B, generally designated 30, comprises an electric discharge unit 31, a forming coil assembly 32 comprising a primary coil 34 and a secondary forming coil 36, the two coils being in an inductance relationship with one another. The primary coil 34 is in direct electric contact with an electric discharge circuitry 38 of electric discharge unit 30 which similarly as in the embodiment of FIG. 1A, comprises a capacitor or bank of capacitors 40 and a pulse control module 42.

The apparatuses shown in FIG. 1 are generally known per se. The novelty in accordance with the invention resides in the nature of the forming coils, which will be exemplified in the embodiments below.

Figure 2:
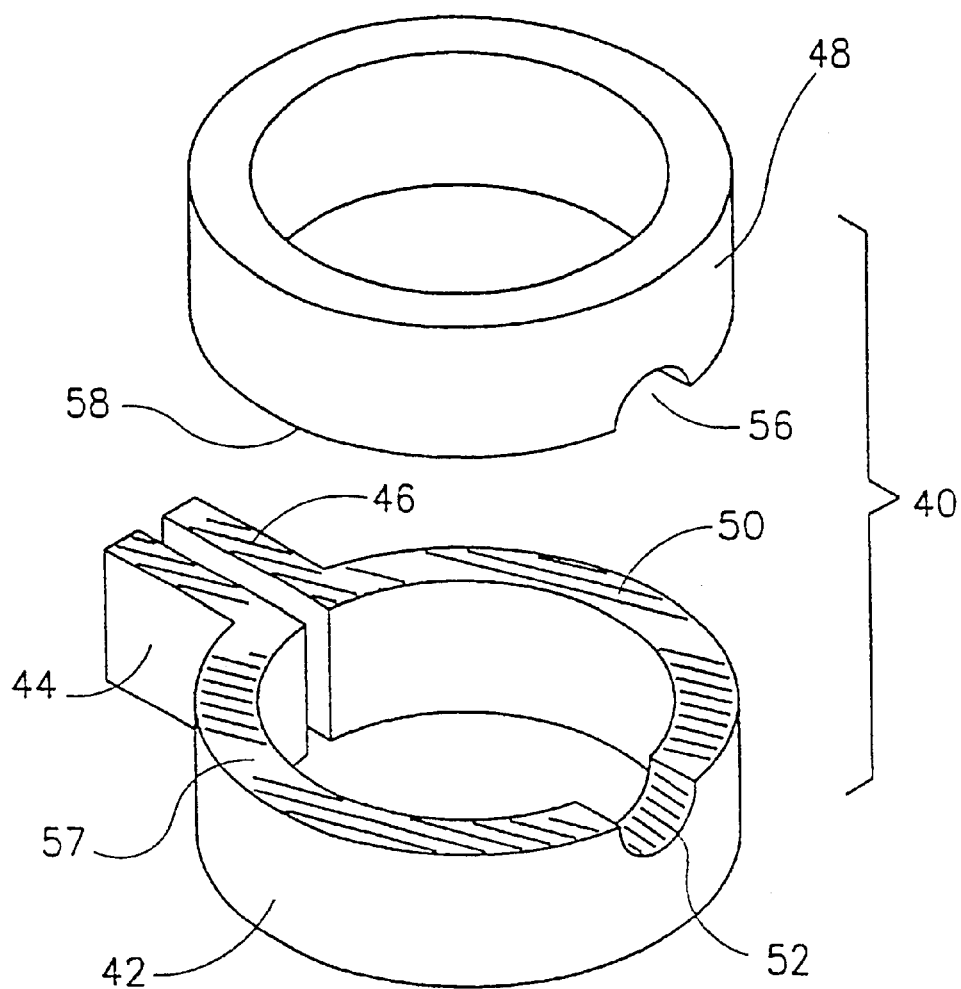
FIG. 2 is an exploded view of an embodiment of a forming coil assembly in accordance with the first aspect of the invention.

A coil assembly in accordance with the first aspect of the invention is shown in FIG. 2. The coil assembly generally designated 40 comprises a coil member 42 having two ends 44 and 46 connectable to an electric discharge circuitry such as that shown in FIG. 1A. Coil assembly 40 further comprises a ring member 48 which traces a path parallel to that traced by coil member 42. Coil member 42 has in its upper face 50 an axially oriented recess 52 having a semi-circular cross-sectional shape. Ring member 48 has in its lower face 54 a similar axially oriented recess 56. Upper face 50 of coil member 42 and lower face 54 of ring member 48, as well as the walls of recesses 52 and 56, are covered by an electrically insulating layer 57 and 58.

Figure 3:
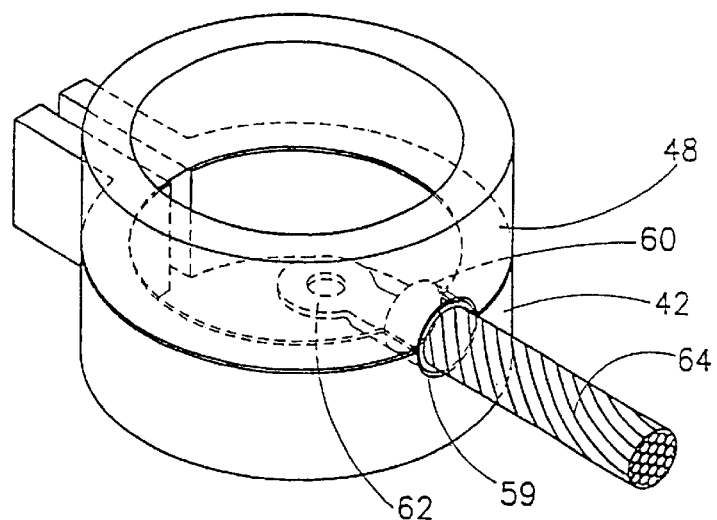
FIG. 3 shows the forming coil of FIG. 2 with the two coil members placed together for electromagnetic joining of a cable lug to a cable.

When ring member 48 is placed on coil member 42, as can be seen in FIG. 3, the two recesses define together a forming space 59. In the specific example shown herein, forming space 59 accommodates the cylindrical receptacle portion 60 of a cable lug 62. The cylindrical receptacle portion 60 holds an end of an electric cable 64.

Figure 4:
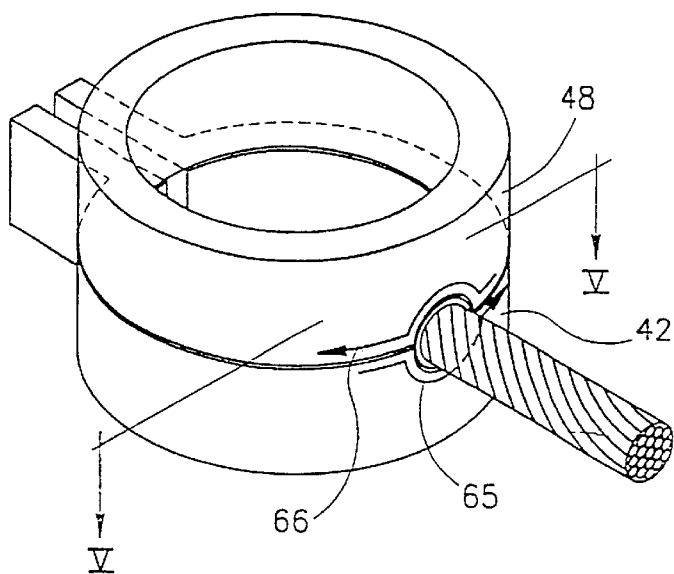
FIG. 4 shows the assembly of FIG. 3 demonstrating the direction of a current flow around the forming space holding the cable lug.

When a current pulse is discharged through coil member 42, as there is no electric contact between it and ring member 48, it gives rise to eddy currents resulting in a counter-current flow in ring member 48, as can be seen by arrows 65 and 66 in FIG. 4.

Figure 6:
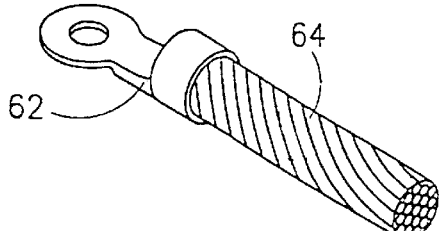
FIG. 6 shows a joint between a cable lug and a cable formed by the use of the forming coil of FIGS. 2–4.
Figure 5:
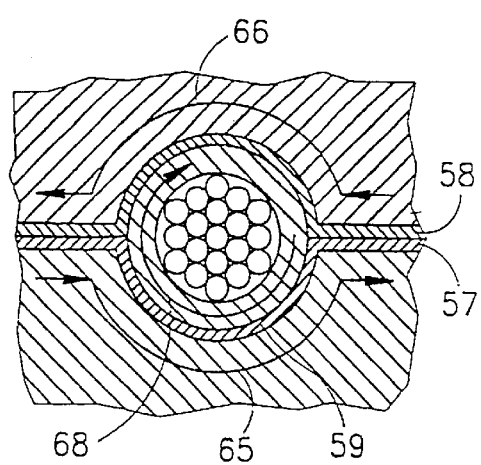
FIG. 5 is a partial, enlarged vertical cross-section, through lines V—V in FIG. 4.

Reference is now being made to FIG. 5, which shows a portion in cross-section of coil member 42 and ring member 48. The electrically insulating layers 57 and 58 extending also over the internal walls of forming space 59 can be clearly seen here. The pulsed electric current (arrows 65 and 66) which flows around space 59, causes the formation of a counter-rotational eddy current (arrow 68) in the cylindrical receptacle 60 causing a magnetic pressure giving rise to shrinkage of cylindrical receptacle 60 onto electric cable 64 and to the consequent joining of the two to one another. The cable lug 62 engaged with an end of electric cable 64 following such forming is represented in FIG. 6.

As will be appreciated, the magnetic forces which develop in coil system 40, also give rise to forces which work in the direction of separation of ring member 48 from coil member 42 and accordingly, these two members should be held tightly one against the other.

It will be appreciated, that forming of a cable lug is only an example and the apparatus may be used for forming of a myriad of other cylindrical workpieces.

Figure 7:
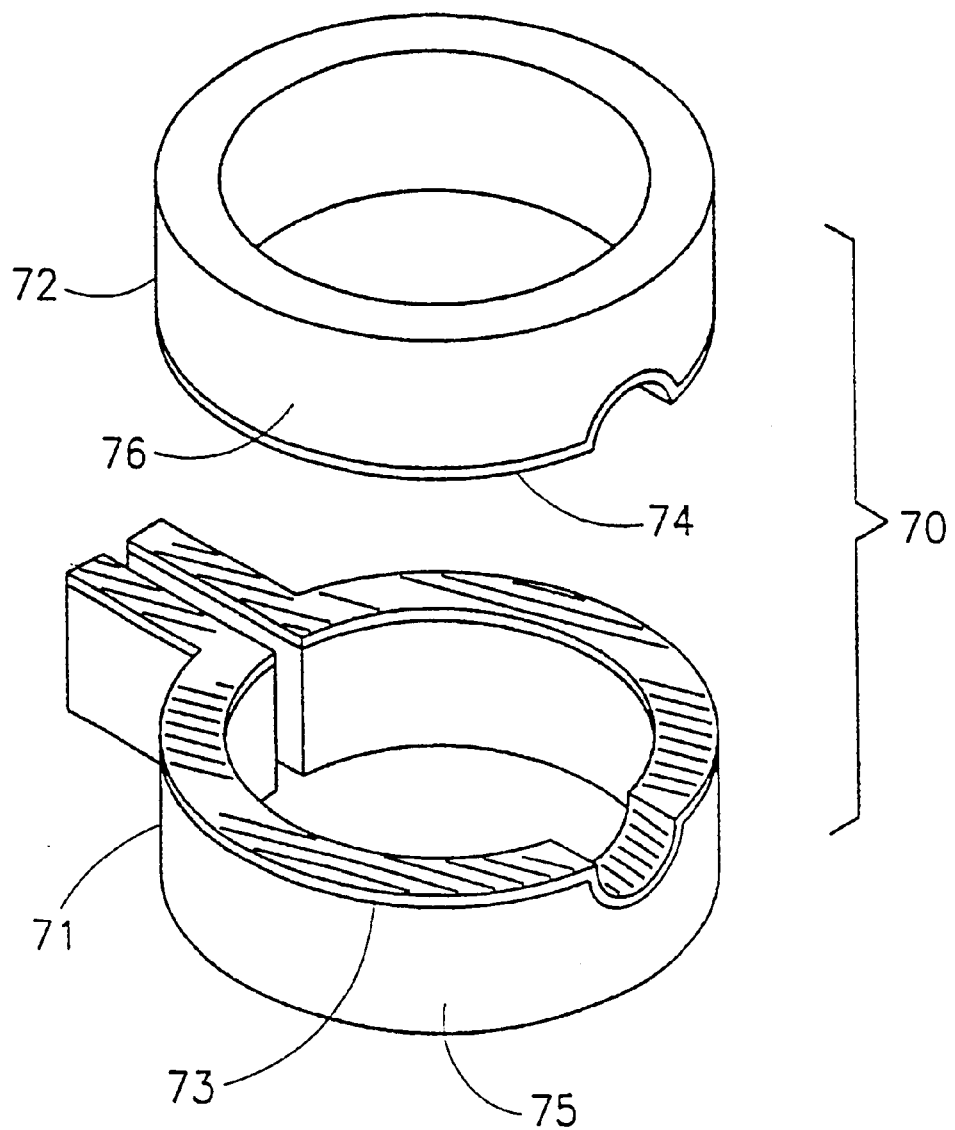
FIG. 7 shows another embodiment of a forming coil assembly in accordance with the first aspect of the invention.

Another embodiment of a coil assembly in accordance with the first aspect of the invention is shown in FIG. 7. The coil assembly in accordance with this embodiment, generally designated 70, comprises similarly as in the embodiment of FIG. 6, a coil member 71 and a ring member 72. However, whereas in the embodiment of FIG. 2, coil member 42 and ring member 48 are made entirely or electrically conducting material such as copper, brass, steel, etc., in this embodiment there is an electro conductive layer 73 on the upper case of coil member 71 and equally an electro conductive layer 74 on the lower face of ring member 72. The respective main bodies 75 and 76 of coil member 71 and ring member 72 are made of an electrically non-conducting material such as for example, epoxyglass. Similarly as in the case of the embodiment of FIGS. 2–6, the electrically conductive layer is covered by a thin layer made of an electrically insulating substance. The advantage of this embodiment is that the relatively limited space where current can flow, decreases energy losses as compared to the embodiment of FIG. 2; otherwise the two are very similar in function.

Figure 8A:
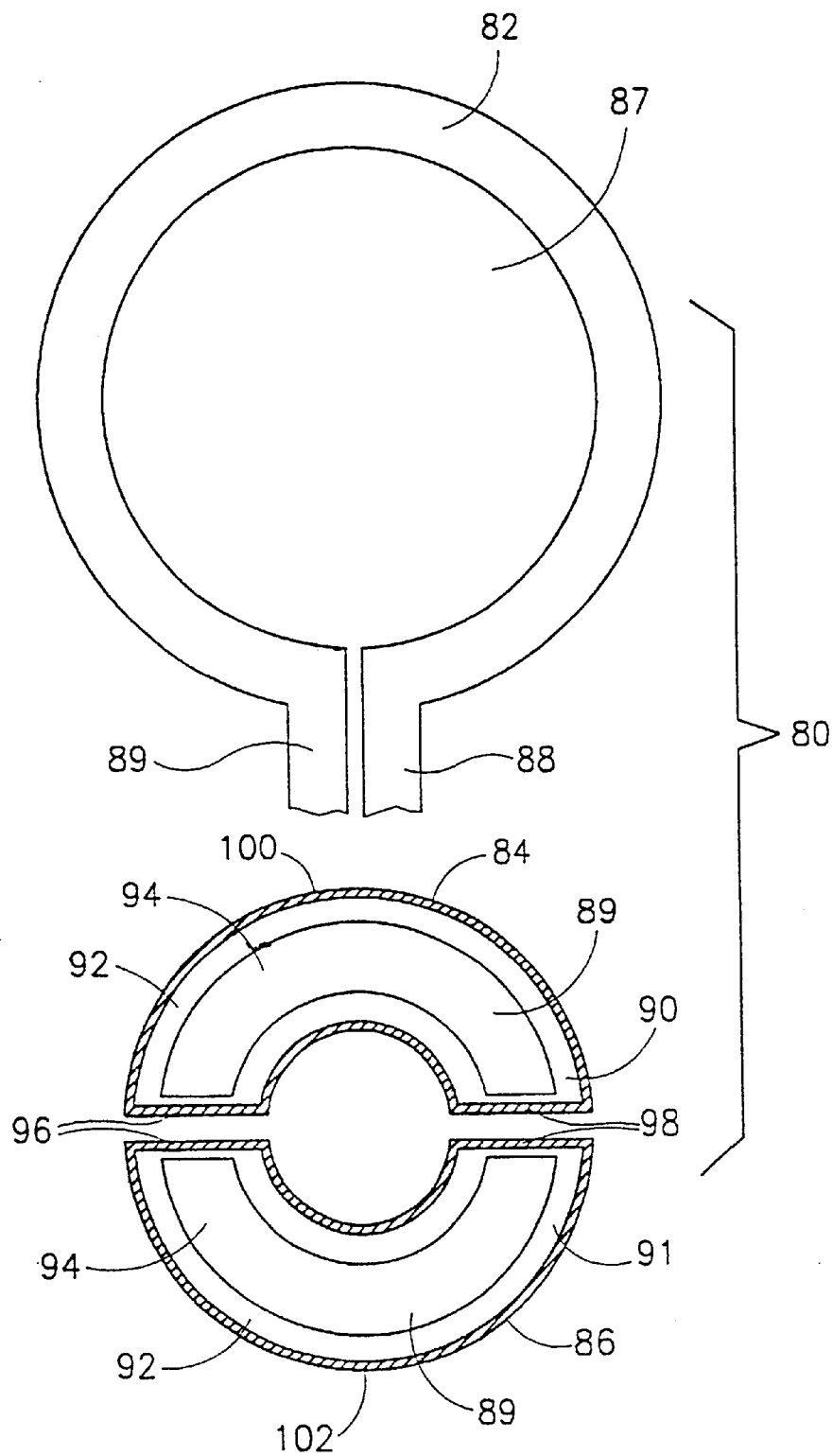
FIG. 8A shows the coil and the insert separated prior to assembly.
Figure 8B:
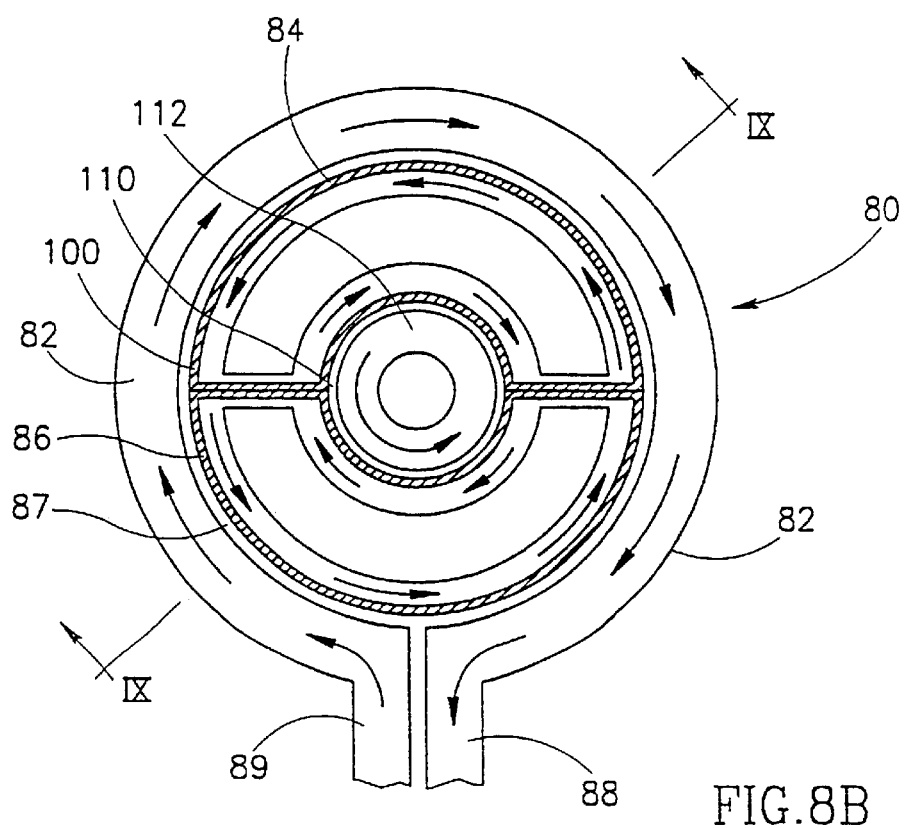
FIG. 8B shows these components assembled during operation in forming a cylindrical workpiece.

Reference is now being made to FIG. 8, showing a side elevational view of a forming coil assembly generally designated 80 in accordance with the second aspect of the invention. Assembly 80, which is shown with its components separated from one another in FIG. 8A and assembled in FIG. 8B comprises a forming coil 82 and to inserts 84 and 86. Forming coil 82 is shown in FIG. 8 as a single wind coil, this being for the sake of simplicity of illustration; as will be appreciated, forming coil 82 will typically be a coil with a number of windings, e.g. three as can be seen in the cross-sectional view shown in FIG. 9. Coil 82 has two end leads 88 and 89 which are typically in direct electrical contact with a discharge circuitry. Coil 82 corresponds to coil 34 in FIG. 1B. Inserts 84 and 86 have both a crescent like semi-circular shape and comprise each a core 89, which may be made of an electrically insulating material e.g. epoxyglass or may he a void core, and respective electrically conducting sheaths 90 and 91 e.g. made of copper, brass, etc. The sheath has each an outer sheath portion 92, an inner sheath portion 94 and two intermediate sheath portions 96 and 98. Sheaths 90 and 91 are covered by thin respective layers 100 and 102 made of an electrically insulating material. The other sheath portions are also optionally covered by layers made of an electrically insulating material (not shown)

Inserts 84 and 86 are accommodated within the space 87 defined by coil 82, as can be seen in FIG. 8B, and they in turn define together a forming space 110 which is adapted to receive a cylindrical workpiece 112. Inserts 84 and 86 serve together in effect as a field shaper concentrating the magnetic force in the forming space 110. For forming, workpiece 112 is first placed within space 87 and then inserts 84 and 86 are fitted within the space within coil 82 and around workpiece 112. After forming, which is performed in the manner which will be described below, the two inserts 84 and 86 can be removed allowing them easy removal of the formed workpiece.

Figure 9:
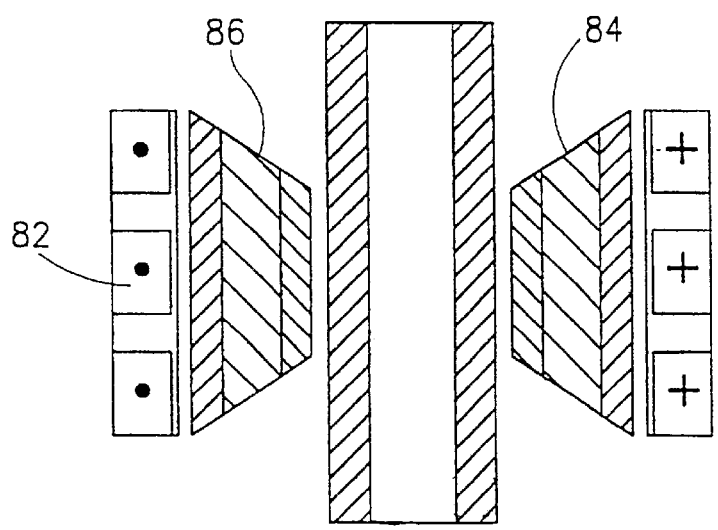
FIG. 9 shows a cross-section through lines IX—IX FIG. 8B.

As can be seen in FIG. 9, primary coil 82, as already pointed out above, is in this embodiment a three-wind coil and inserts 84 and 86 have a trapezoid cross-sectional shape and, as already pointed out above, act in effect as field shapers concentrating the magnetic force in a more narrow forming space 110.

In operation, a pulsed electric current is discharged through coil 82, which in this specific example flows in a clockwise direction. This gives rise to a counter-clockwise current in outer sheath portion 92 which in turn gives rise to a clockwise rotational current in inner sheath portion 94. The combined current in the two inner sheath portions 94 gives rise to a loop of current around cylindrical workpiece 112 which gives rise to a counter-clockwise current in the walls of workpiece 112. This creates a magnetic pressure which causes shrinking of cylindrical workpiece 112. As will be appreciated, the coil assembly should be firmly stabilized so that the magnetic pressure will give rise to movement of only the walls of cylindrical workpiece 112, i.e. shrinkage thereof.

Figure 10:
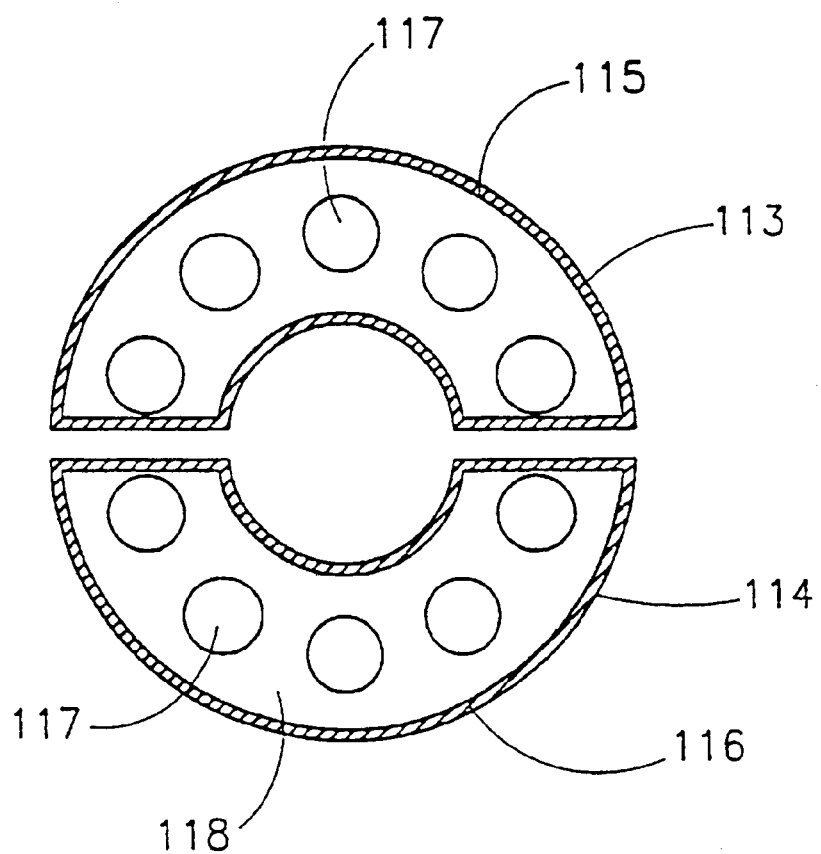
FIG. 10 shows another embodiment of inserts for use in a forming coil assembly according to said second aspect.

Reference is now being made to FIG. 10, showing another embodiment of inserts 113 and 114 useful in coil assembly 80 instead of inserts 84 and 86. Inserts 113 and 114 have, similarly as inserts 84 and 86, a crescent like semi-circular shape. Similarly as inserts 84 and 86, inserts 113 and 114 are covered by thin respective layers 115 and 116 made of an electrically insulating material.

Unlike inserts 84 and 86, inserts 113 and 114 do not have a core such as core 89, but rather made entirely of electrically conducting material, e.g. copper, brass or steel, and have each several circular voids 117 (five in each in this example of the embodiment). In such an insert, upon discharge of electric current through the primary coil, it will be a current loop comprising a current in one direction at the outer face 118 and a current in the opposite direction at the inner face 119 creating a current loop around the forming space. In order to increase the yield and avoid current losses, the size of the voids should be as large as possible, taking into account the structural considerations.

One advantage of an insert such as that shown in FIG. 10, is in its construction which is less complicated than that of the inserts shown in FIG. 8A.

Figure 11A:
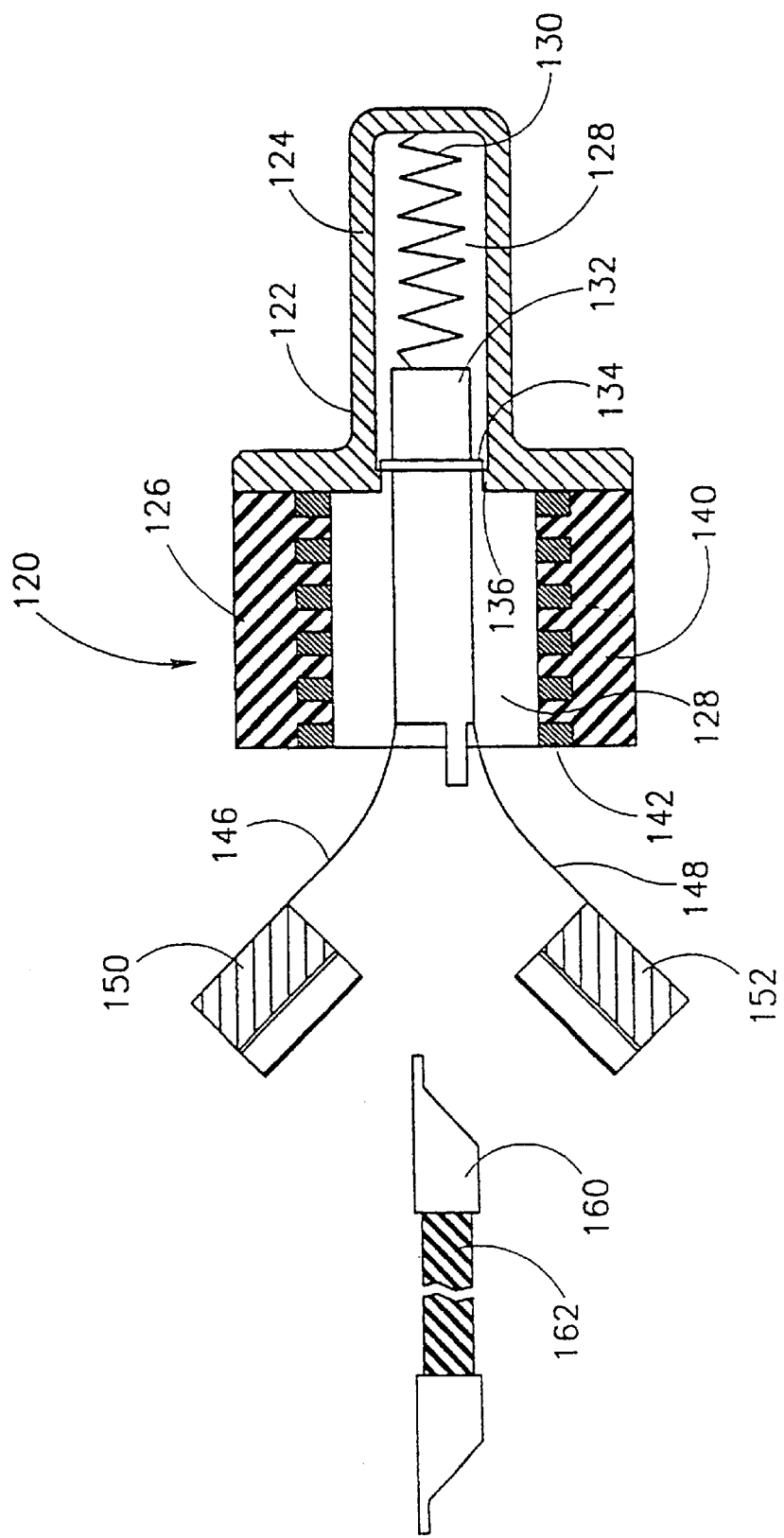
FIG. 11A shows the forming coil in an open position prior to inserting the cable lug and the cable to be joined.

Reference is now being made to FIG. 11A, showing an embodiment of a forming coil device 120 in accordance with the second aspect of the invention. The device comprises a housing 122 defining a handle portion 124, and a forming coil holding portion 126. Handle portion 124 has a hollow interior 128 which accommodates a spring 130 which is attached to and provides a forward biasing force on plunger member 132. Plunger member 132 has an annular projection 134 which by engagement with annular shoulders 136 provides a limit to the forward movement of plunger member 132.

Portion 126 has a cylindrical body 140 made of a rigid, insulating material holding several rings (six in this example) of a primary coil 142. The primary coil 142 is connected to an electric discharge circuit (not shown), and tantamounts to the primary coil 34 of the apparatus in FIG. 1B.

Plunger member 132 has a forward projection 144 at its front end and is connected by two flexible connectors 146 and 148 to respective inserts 150 and 152. Inserts 150 and 152 are principally similar to inserts 89 shown in FIGS. 8 and 9 (i.e. having a crescent semi-circular shape, and having a core made of an electrical insulating material covered by a sheath of an electrically conducting material, the sheath comprising an outer sheath portion, an intermediate sheath portion and an inner sheath portion (not-shown in FIG. 11)).

Figure 11B:
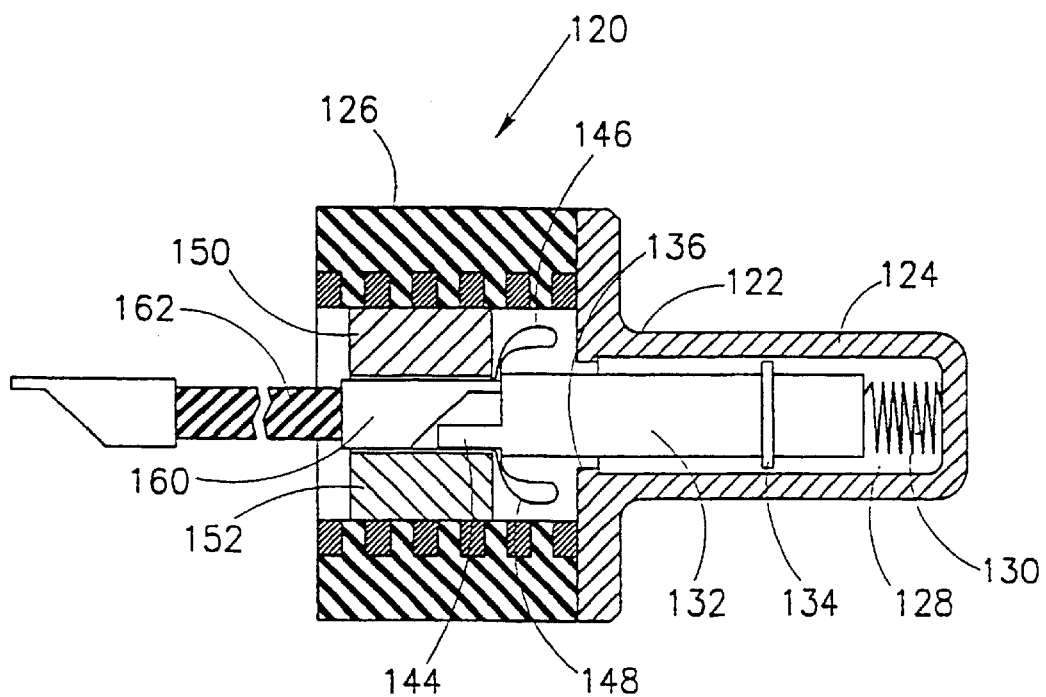
FIG. 11B shows the forming coil in a closed, working state.

The apparatus of FIG. 11 is adapted for field use in the joining of a cable lug 160 with an end of an electrical cable 162. When the cable lug 160 with the cable 162 is pushed into forming coil device 120, plunger 132 is pushed backwards against the biasing force of spring 130. Furthermore, inserts 150 and 152 retreat then into the device defining together a forming space 170. Then, when an electric pulse is passed through a coil 142, magnetic pressure is created in a similar fashion to that described with reference to the embodiment of FIGS. 8 and 9, and causes the joining of the cylindrical portion of cable lug 160 with cable 162.

Figure 12A:
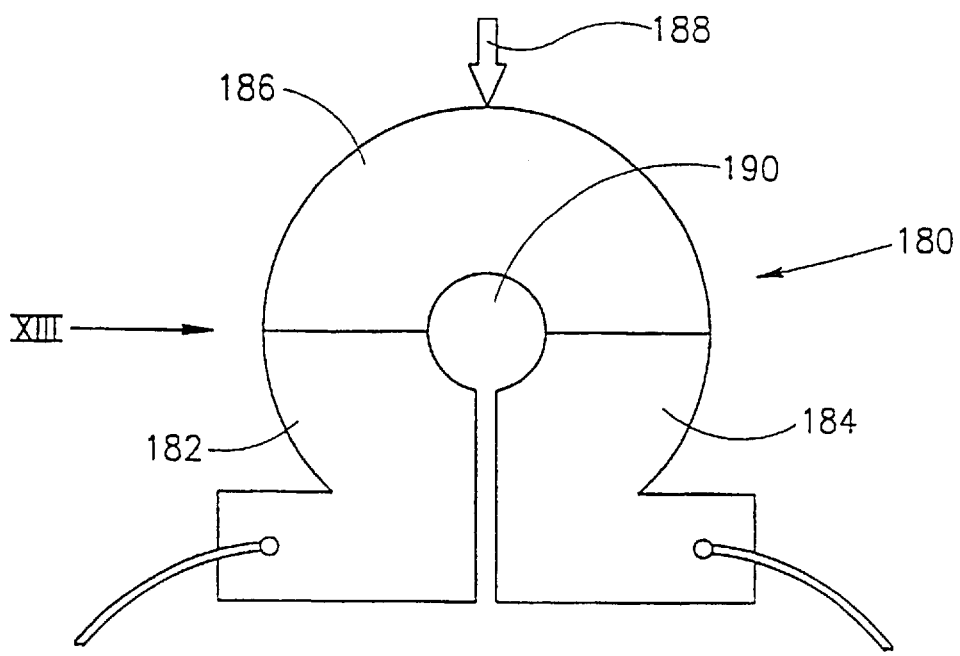
FIG. 12 shows a front elevational view of two embodiments of forming coils in accordance with the third aspect of the invention.

Reference is now being made to FIG. 12 showing coils in accordance with the third aspect of the invention. Coil assembly 180 shown in FIG. 12A consists of three coil sections including the first section 182 which is an electric contact with a first pole (not shown) of an electric discharge circuitry stand as that shown in FIGS. 1A or 1B, a second section 184 which is in electrical contact with the other pole (also not shown in this figure) and a third, intermediate section 186 detachably engaged with the two other sections. In order to ensure tight engagement, pressure from the direction of arrow 188 may have to be applied. The three coil sections define together a forming space 190. Sections 182 and 184 are tightly fixed whereas section 186 is detachably attached to the other two sections and can be removed to allow placing off or removal of a cylindrical workpiece to be worked into forming space 190.

Figure 12B:
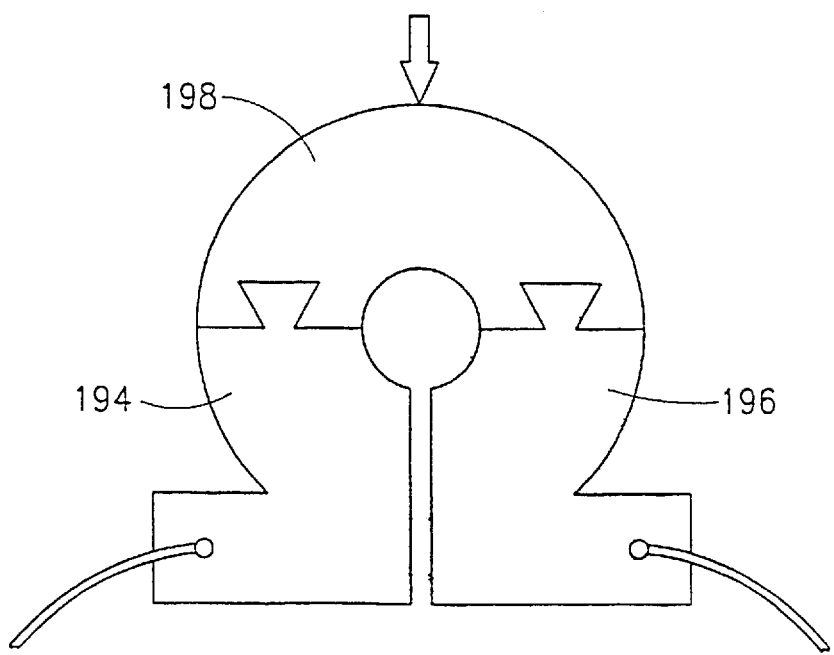

A form of attachment, in accordance with another embodiment can be seen in coil assembly 192, shown in FIG. 12B, wherein section 198 is attached to sections 194 and 196 by a dovetailing type of attachment.

Figure 13A:
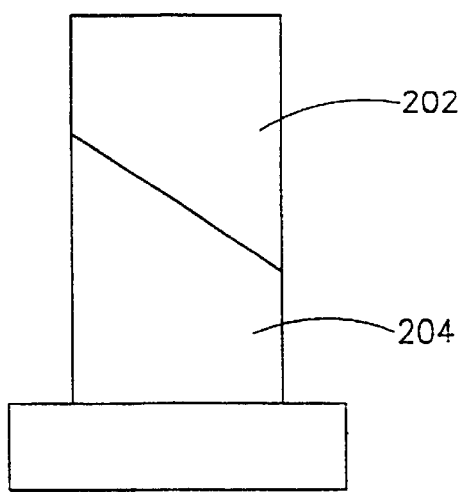
FIG. 13 shows three different specific embodiments of coils of the kind shown in FIG. 12 viewed from the side (from the direction given by arrow XIII in FIG. 12).
Figure 13B:
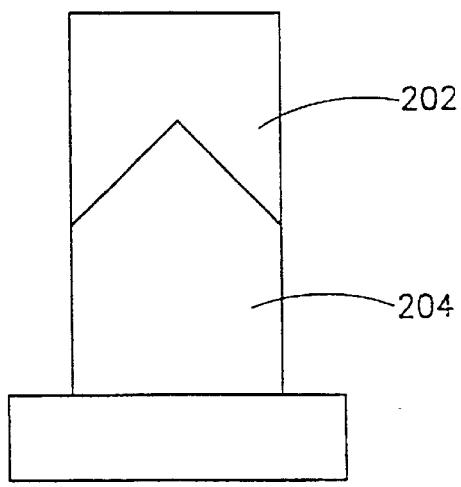
Figure 13C:
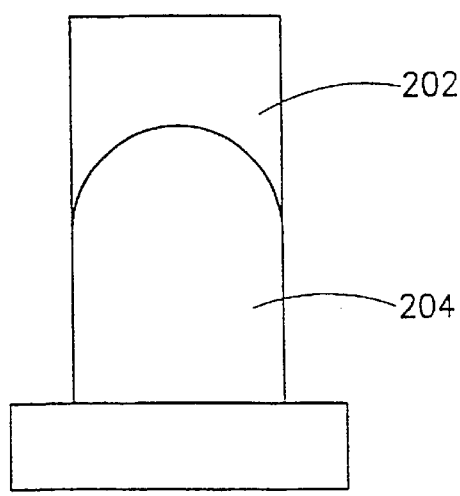

FIG. 13 is a schematic side view showing several forms of attachment between an intermediate coil section 202 and a section 204 which is connected to an electric discharge circuitry. These forms of attachment all serve to increase the contact surface between the different sections, so as to improve detachment and reduce the electric resistance thereof. These include an attachment with an oblique attachment line (FIG. 13A), attachment with a pyramidal attachment line (FIG. 13B) and an attachment with a semi-circular attachment line (FIG. 13C).

Having concluded the description of the above specific embodiment, it will be clear to the artisan that this is an example only of a myriad of other embodiments all being within the scope of the invention as defined in the appended claims.

What is claimed is:

1. An apparatus for pulse magnetic forming of a tubular workpiece having a coil assembly comprising:
    a single wind first coil member having two ends each of which being in electrical contact with one pole of an electrical discharge mechanism; a second coil member being a complete closed loop and having a shape and size which corresponds to a shape and size of said first coil member; the first and second coil members having an electrically insulating layer between them and being detachably attached to one another; said first coil member having a first recess or undulation and said second coil member having a second recess or undulation, said first and second recesses or undulations being juxtaposed to one another and defining together a forming space shaped to accommodate the tubular workpiece.

2. An apparatus according to claim 1, wherein said first coil member and said second coil member are made each of a metal block, the first coil member and the second coil member having each a face wherein when said first and second coil members are attached to one another, said face of the first coil member juxtaposes said face of the second coil member, the said face of each of the first and second coil members being covered by an electrically insulating layer.

3. An apparatus according to claim 1, wherein said first coil member comprises a block made of an electrically insulating material having a top face comprising a conducting metal band; said second coil member comprises a block made of an electrically insulating material and having a bottom face comprising a conducting metal band; said conducting metal bands being coated by an electrically insulating layer; wherein when said first and second coil members are attached to one another, said conducting metal bands juxtapose one another.

4. An apparatus for pulse magnetic forming of a tubular workpiece comprising:
    at least one primary coil electrically connected to an electrical discharge mechanism; two removable inserts defining together a loop with an outer surface within and adjacent said at least one primary coil and an inner surface defining a cylindrical forming space shaped to accommodate the tubular workpiece, each insert having two end portions, the end portions of one insert being adjacent the end portions of the other insert wherein there is no electrical contact between the end portions of the two removable inserts; each of said inserts defining a current flow path comprising the outer and inner surfaces of the inserts and upon discharge of current in the primary coil which gives rise to current flow in the primary coil in a first circular direction, current in the outer surface of the insert flows in a second direction opposite the first and current in the inner surface flows in said first direction, whereby the current flowing in the inner surface of the two removable inserts form together a loop of current around the cylindrical forming space; characterized in that
    each of said inserts comprises a core which may be either a metal core surrounded by an electrically conducting sheath or a metal block having one or more voids in a direction parallel to and intermediate between the outer and the inner surfaces of said inserts.

5. An apparatus according to claim 4, comprising a housing holding a primary coil with a receiving space for receiving said removable inserts, insertion of said tubular workpiece into the housing causing said inserts to become fixed in position within said receiving space to accommodate said tubular body within the forming space defined by said removable inserts.

6. An apparatus according to claim 5, wherein said housing comprises a handle-defining portion to allow holding thereof by a user.

7. An apparatus according to claim 5, wherein said housing accommodates a plunger member connected to said inserts; the plunger being movable between a retracted and an extended position and being biased to the extended position; wherein when said plunger is in the extended position, said inserts are outside said housing and when said plunger is in the retracted position said inserts are retracted into the housing to define said forming space.

8. An apparatus according to claim 7, wherein said plunger is moved to the retracted position by insertion of said tubular workpiece.

9. An apparatus according to claim 6, wherein said housing accommodates a plunger member connected to said inserts; the plunger being movable between a retracted and an extended position and being biased to the extended position; wherein when said plunger is in the extended position, said inserts are outside said housing and when said plunger is in the retracted position said inserts are retracted into the housing to define said forming space.

10. An apparatus according to claim 9, wherein said plunger is moved to the retracted position by insertion of said tubular workpiece.

* * * * *